C. A. CLARK.
TIRE REMOVER.
APPLICATION FILED AUG. 7, 1919.
1,361,306. Patented Dec. 7, 1920.
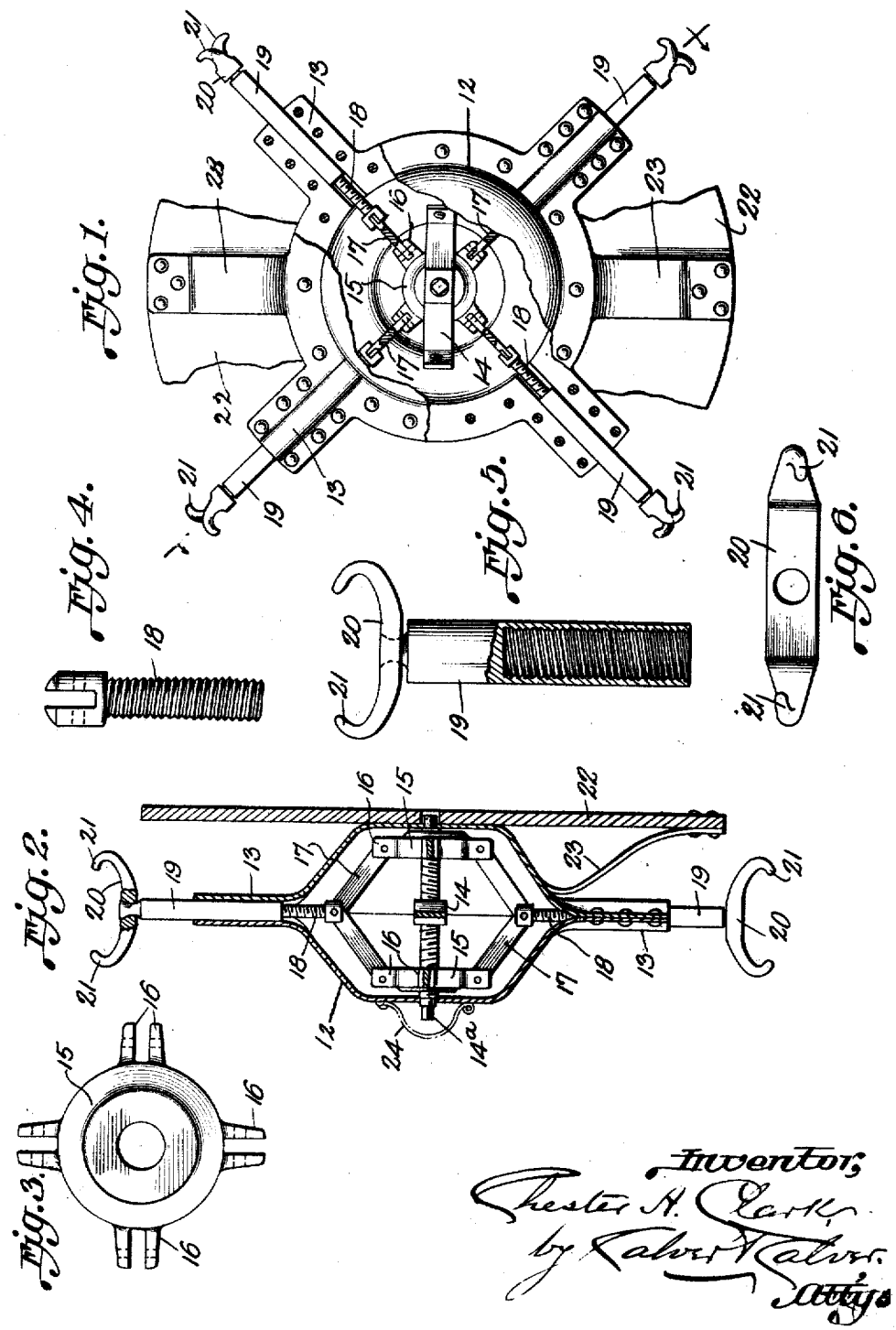

UNITED STATES PATENT OFFICE.

CHESTER ALVEN CLARK, OF KENNETT, CALIFORNIA.

TIRE-REMOVER.

1,361,306.　　　Specification of Letters Patent.　　Patented Dec. 7, 1920.

Application filed August 7, 1919. Serial No. 315,884.

*To all whom it may concern:*

Be it known that I, CHESTER A. CLARK, citizen of the United States, residing at Kennett, in the county of Shasta and State of California, have invented or discovered certain new and useful Improvements in Tire-Removers, of which the following is a specification, reference being had therein to the accompanying drawing.

This invention relates to a device for removing and replacing automobile tires, and which is also adapted to serve as a tire carrier, and has for its object to provide a device of this kind which is simple in construction and convenient in operation so that a tire may be quickly removed from and replaced on a rim. To this end the invention comprises a series of hooked arms or members adapted to be engaged with the flanges of the rim and having swiveled connections with shanks engaged by screw bolts which are in turn connected by links with hubs mounted on a screw shaft having right and left hand threads and which shaft may be turned to cause the said heads to recede from or approach toward each other. The screw-threaded connections of the said shanks with the screw bolts enable the hooked members to be adjusted in and out, by turning said shanks on said bolts, for use in connection with different sized rims. The shanks of the hooked members and their operating parts just referred to are preferably inclosed in a two-part casing which provides sleeves in which the said shanks may move in and out radially. By engaging the hooked members with the flanges of a tire rim and then turning the screw shaft in the proper direction the said hooked members may be drawn inward in such a manner as to contract a split or jointed rim so as to enable a tire to be readily removed from or mounted on such rim.

In the accompanying drawing Figure 1 is a general view of the invention with the casing partly broken away, and Fig. 2 is a sectional view of the same. Figs. 3, 4, 5 and 6 are detail views of certain parts of the device.

Referring to the drawing, 12 denotes a casing part or housing preferably formed in two parts of thin plate steel and having arms 13 bent at their central portions to semicircular form in cross section in each casing part, leaving side flanges which may be riveted together, thus forming radial sleeves. Suitably supported in the casing 12 is a shaft 14 having right and left hand threaded parts on which are mounted hubs 15 each having slotted projections 16 to which are pivoted the outer ends of links 17 jointed at their inner ends to the heads of bolts 18, said bolts having screw threaded shanks tapped in tubes 19 mounted to slide endwise in the sleeves afforded by the arms 13. Mounted at the outer ends of the tubes 19, and having swiveled connections therewith, are hooked members 20, the hooks 21 at the opposite ends of said members being preferably reversely inclined relative to the length of said members, as more clearly shown in Fig. 6, so that they may be readily engaged with the flanges of a tire, by turning them slightly on their swiveled connections with the tubes or shanks 19 on which they are mounted, thus engaging first one of the hooks 21 with a tire flange and then engaging the other therewith.

In the operation of the invention the hooks 21 of the members 20 are engaged with the flanges of a tire rim and the screw shank 14 is then turned by applying a wrench to its squared end $14^a$ in such a manner as to cause the hubs 15 to recede from each other, thereby drawing the bolts 18 and the tubes or shanks 19 and hooked members 20 inward and thus contracting a split or jointed rim in such a manner that the tire may be readily removed from or mounted or placed thereon.

This removing and replacing device may be used as a rim and tire holder or carrier to be mounted on a vehicle, and to this end a support, as 22, may be connected with the casing 12 by arms 23 attached to or integral with said support and casing, the support to be attached to some part of the vehicle in any suitable manner.

The casing 12 may be provided with a door or cover 24 to form a closure over the squared outer end of the screw shaft 14, and this door may be provided with a suitable lock so as to prevent unauthorized access to said squared end of said shaft and unauthorized removal of a tire from the device when used as a tire carrier.

Having thus described my invention I claim and desire to secure by Letters Patent:

1. A tire removing and replacing and tire carrying device comprising a suitable casing, a shaft mounted in said casing and having right and left screw-threaded parts, hubs mounted on said screw shaft and in engagement with the threaded parts thereof so as to move oppositely endwise of said shaft when the latter is turned, links connected with said hubs, and hooked members connected to said links and adapted to be drawn inward to contract a rim when a tire is to be removed therefrom or placed thereon.

2. A tire removing and replacing and tire carrying device comprising a suitable casing, a shaft mounted in said casing and having right and left screw-threaded parts, hubs on said screw shaft, links connected with said hubs, hooked members connected to said links and adapted to be drawn inward to contract a rim when a tire is to be removed therefrom or placed thereon, the connection of said hooked members with said links being afforded by threaded bolts to the heads of which the inner ends of said links are connected, and tubes slidable in portions of said casing parts and with which tubes said bolts have screw-threaded connections and to the outer ends of which tubes said hooked members are swiveled.

3. A tire removing and replacing and tire carrying device comprising a suitable casing, a shaft mounted in said casing and having right and left screw-threaded parts, hubs on said screw shaft and movable oppositely on said shaft when the latter is turned, links connected with said hubs, and hooked members connected to said links and adapted to be drawn inward to contract a rim when a tire is to be removed therefrom or placed thereon, the hooks on said hooked members being reversely inclined, as set forth.

4. A tire removing and replacing and tire carrying device comprising a suitable casing, a shaft mounted in said casing and having right and left screw-threaded parts, hubs on said screw shaft and movable endwise of said shaft when the latter is turned, links connected with said hubs, hooked members connected to said links and adapted to be drawn inward to contract a rim when a tire is to be removed therefrom or placed thereon, the connection of said hooked members with said links being afforded by threaded bolts to the heads of which the inner ends of said links are connected, and tubes slidable in portions of said casing parts and with which tubes said bolts have screw-threaded connections and to the outer ends of which tubes said hooked members are swiveled, the hooks on said hooked members being reversely inclined, as set forth.

5. A tire removing and replacing and tire carrying device comprising a sheet metal casing formed in two parts secured together, a shaft mounted in said casing and having right and left screw-threaded parts, hubs on said screw shaft and movable endwise thereof when said shaft is turned, links connected with said hubs, and hooked members connected to said links and adapted to be drawn inward to contract a rim when a tire is to be removed therefrom or placed thereon.

6. A tire removing and replacing and tire carrying device comprising a sheet metal casing formed in two parts secured together, a shaft mounted in said casing and having right and left screw-threaded parts, hubs on said screw shaft and movable endwise thereof when said shaft is turned, links connected with said hubs, hooked members connected to said links and adapted to be drawn inward to contract a rim when a tire is to be removed therefrom or placed thereon, the connection of said hooked members with said links being afforded by threaded bolts to the heads of which the inner ends of said links are connected, and tubes slidable in portions of said casing parts and with which tubes said bolts have screw-threaded connections and to the outer ends of which tubes said hooked members are swiveled.

7. A tire removing and replacing and tire carrying device comprising a shaft having right and left screw-threaded parts, means for supporting said shaft, hubs movable endwise of said shaft when the latter is turned, hooked members adapted to engage a tire rim, and connections between said hubs and said hooked members.

In testimony whereof I affix my signature.

CHESTER ALVEN CLARK.